(12) United States Patent
Sayres

(10) Patent No.: US 8,488,936 B2
(45) Date of Patent: Jul. 16, 2013

(54) FIBER RETAINER FOR CABLE TROUGH MEMBER

(75) Inventor: Derek Sayres, Lonsdale, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 511 days.

(21) Appl. No.: 12/763,268

(22) Filed: Apr. 20, 2010

(65) Prior Publication Data

US 2010/0266256 A1 Oct. 21, 2010

Related U.S. Application Data

(60) Provisional application No. 61/170,875, filed on Apr. 20, 2009.

(51) Int. Cl.
*G02B 6/00* (2006.01)

(52) U.S. Cl.
USPC .......................... 385/137; 174/481

(58) Field of Classification Search
USPC .......................... 385/137; 174/481
See application file for complete search history.

(56) References Cited

U.S. PATENT DOCUMENTS

| | | | |
|---|---|---|---|
| 3,890,459 A | 6/1975 | Caveney | |
| 4,136,257 A | 1/1979 | Taylor | |
| 4,965,969 A * | 10/1990 | Antenen | 52/12 |
| 5,067,678 A | 11/1991 | Henneberger | |
| 5,316,243 A | 5/1994 | Henneberger | |
| 5,752,781 A | 5/1998 | Haataja | |
| 5,756,933 A * | 5/1998 | Pitchford et al. | 174/481 |
| 5,898,134 A | 4/1999 | Fallin | |
| 6,044,194 A | 3/2000 | Meyerhoefer | |
| 6,193,198 B1 * | 2/2001 | Baur et al. | 248/222.41 |
| 6,437,243 B1 | 8/2002 | Vandervelde | |
| 6,468,112 B1 | 10/2002 | Follingstad | |
| 6,567,602 B2 * | 5/2003 | Cole et al. | 385/136 |
| 6,766,093 B2 | 7/2004 | McGrath | |
| 6,835,891 B1 | 12/2004 | Herzog | |
| 6,918,796 B2 | 7/2005 | Elliot | |
| 6,964,588 B2 | 11/2005 | Follingstad | |
| 7,060,901 B2 | 6/2006 | Herzog | |
| 7,083,051 B2 | 8/2006 | Smith | |
| 7,220,150 B2 | 5/2007 | Follingstad | |
| 7,285,027 B2 | 10/2007 | McGrath | |
| 7,315,680 B1 | 1/2008 | Rapp | |
| 7,331,473 B2 | 2/2008 | Smith | |
| 7,381,100 B2 | 6/2008 | Follingstad | |
| 7,411,126 B2 | 8/2008 | Herzog | |
| 7,458,859 B2 | 12/2008 | McGrath | |
| 7,513,374 B2 | 4/2009 | Smith | |
| 7,677,400 B2 | 3/2010 | Bayazit | |
| 2004/0007372 A1 * | 1/2004 | Krietzman et al. | 174/50 |
| 2004/0094491 A1 * | 5/2004 | Smith et al. | 211/26 |

(Continued)

OTHER PUBLICATIONS

Panduit, 068904, 5" Wire Retainer, Copyright 1998, 1 page.

(Continued)

*Primary Examiner* — Charlie Peng
*Assistant Examiner* — Peter Radkowski
(74) *Attorney, Agent, or Firm* — Merchant & Gould P.C.

(57) ABSTRACT

Systems and methods for the management and routing of telecommunication cables include cable trough members. Generally, the trough members include a plurality of retainer members coupled to sidewalls of the trough members. The retainer members assist in maintaining cables within an interior of the trough members.

17 Claims, 20 Drawing Sheets

U.S. PATENT DOCUMENTS

| | | | |
|---|---|---|---|
| 2006/0110117 A1* | 5/2006 | Denovich et al. | 385/135 |
| 2008/0134477 A1* | 6/2008 | Hart et al. | 24/457 |
| 2008/0185483 A1 | 8/2008 | Rapp | |
| 2009/0091909 A1 | 4/2009 | Follingstad | |
| 2009/0093169 A1 | 4/2009 | McGrath | |
| 2009/0223909 A1 | 9/2009 | Smith | |

OTHER PUBLICATIONS

Panduit, FWR-C, Copyright 1995-2009, 1 page.
Panduit, Solid Wall Duct Wire Retainer Drawing #36402-11, Sep. 17, 2001, 1 page.
Panduit, WR2-C, Copyright 1995-2009, 1 page.
Panduit, WR5-C, Copyright 1995-2009, 1 page.
Panduit, 068548, Wiring Duct SA-WDCB05 (replaces SA101N64D-LP), accessed Apr. 15, 2009, 76 pages.
Panduit, 069285, Hinged Cover Wiring Duct, Copyright 2007, 4 pages.
Panduit, 077627, Wire Retainer for US slotted "F" Duct Drawing #35818034, Jan. 21, 1994, 1 page.
Panduit, 078561, Wiring Duct and Cable Management Wire Retainer Drawing #35541-63, Mar. 13, 1997, 1 page.
Panduit, 098786, F-Duct Wire Retainer, Copyright 2000, 2 pages.
Panduit, 078558, Drawing #35541-60, Mar. 13, 1997, 1 page.
Panduit, Solid Wall Duct Wire Retainer (WRS-A), Sep. 17, 2001, 1 page.
Panduit, Panduct® Solid Wall Raceway Type FS and Type D Wiring Duct Wire Retainer (WRS-A-C10), Copyright 1995-2009, 1 page.

* cited by examiner

FIBER RETAINER FOR CABLE TROUGH MEMBER

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplers. U.S. Pat. Nos. 5,067,678; 5,316,243; and 5,752,781 teach cable routing systems that include a plurality of trough members and couplers.

Various concerns arise in the use of trough members. For example, it can be desirable to easily route cables into and out of the trough members. Further, the open ends can allow fiber to potentially escape from the trough members. Even if the trough members include covers to close the open ends, it may be necessary to periodically gain access to the interior portions of the trough members to, for example, add or remove fibers.

SUMMARY

Embodiments of the present disclosure are directed to systems and methods for the management and routing of telecommunication cables and, more particularly, to cable trough members. Generally, the trough members include a plurality of retainer members coupled to sidewalls of the trough members. The retainer members assist in maintaining cables within an interior of the trough members.

The details of one or more techniques are set forth in the accompanying drawings and the description below. Other features, objects, and advantages of these techniques will be apparent from the description, drawings, and claims.

DETAILED DESCRIPTION

Figure 1:
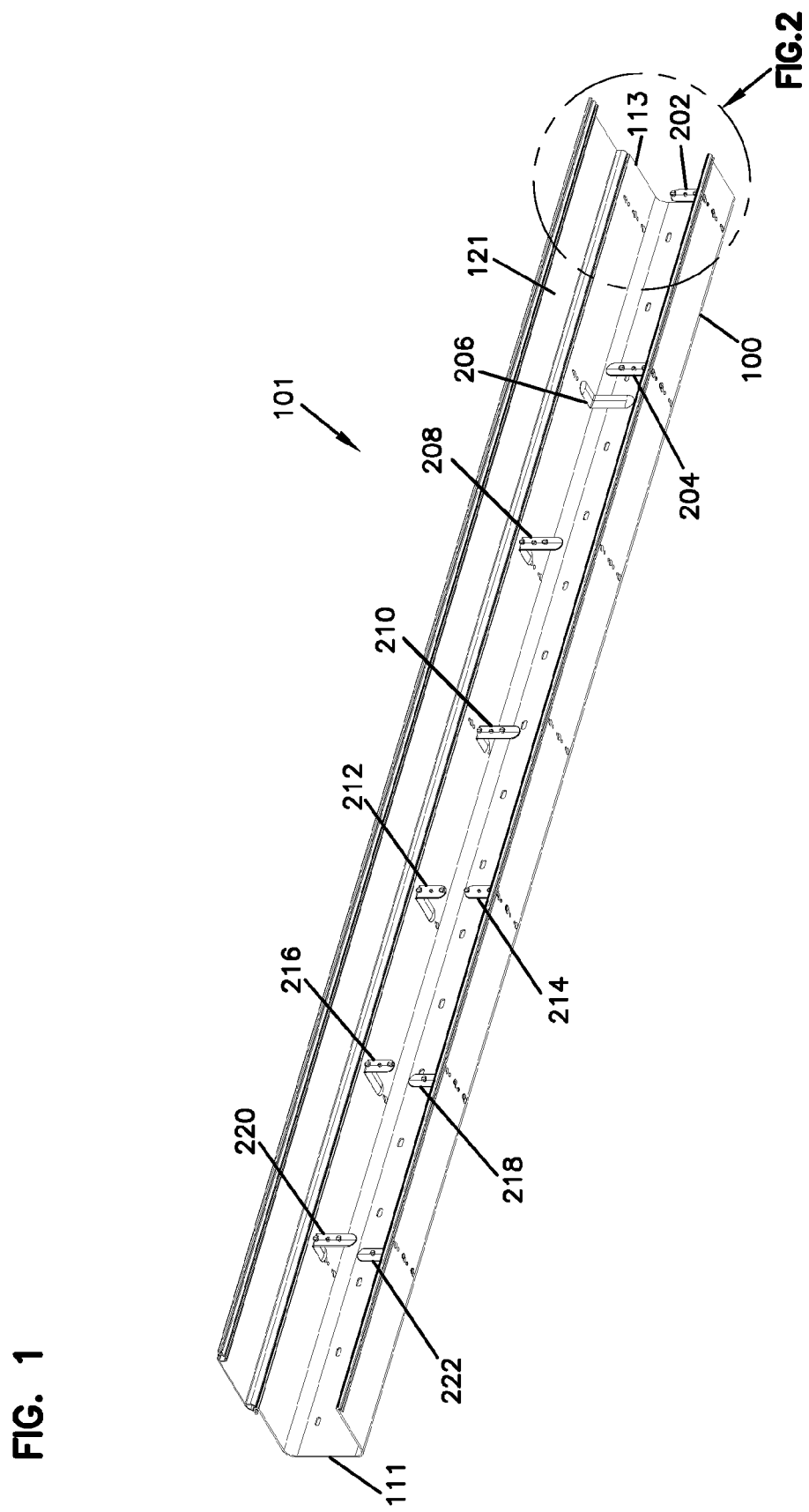
FIG. 1 is a perspective view of an example cable routing system.
Figure 2:
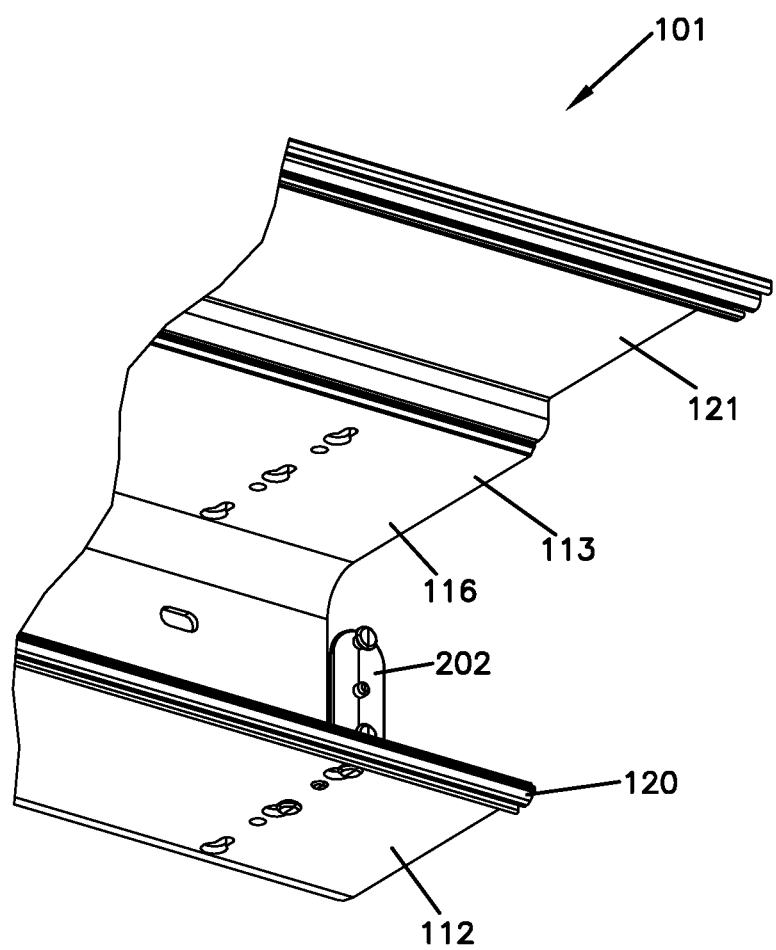
FIG. 2 is a perspective view of a portion of the cable routing system of FIG. 1.

Embodiments of the present disclosure are directed to systems and methods for the management and routing of telecommunication cables and, more particularly, to cable trough members. Generally, the trough members include a plurality of retainer members coupled to sidewalls of the trough members. The retainer members assist in maintaining cables within an interior of the trough members.

As used herein, the phrase "trough member" is used to refer to any trough, fitting, railway, raceway, or similarly configured component including any number of ends. In example embodiments, the trough members can be positioned to extend vertically or horizontally.

Referring now to FIGS. 1-10, an example embodiment of a cable routing system 101 including a trough member 100 is shown.

The example trough member 100 includes first and second sidewalls 112 and 116 coupled to a third wall 114 generally forming a U-shaped trough with an interior space 118 through which cables 119 such as fiber can be run.

The trough member 100 extends lengthwise in a vertical or horizontal direction when in use. The trough member 100 extends from a first end 111 to a second end 113. The trough member 100 can be of varying lengths and widths, and can be coupled to other trough members or similar structures to form the cable routing system 101.

Each of the free ends of the sidewalls 112, 116 includes a hinge portion 120. In example embodiments, the hinge portion 120 is used to allow a cover 121 to be coupled to the trough member 100. In one example, the cover 121 can be coupled to the hinge portions 120 and can be moved between closed and open positions.

Addition details regarding one example cover that can be used with the trough member 100 is described in U.S. patent application Ser. No. 12/183,195 filed on Jul. 31, 2008, the entirety of which is hereby incorporated by reference. In other configurations, the hinge portion 120 and related cover 121 are optional and need not be provided on the trough member.

The trough member 100 also includes a plurality of retainer members 202, 204, 206, 208, 210, 212, 214, 216, 218, 220, 222 (collectively referred to as "retainer members"). The retainer members are coupled to the sidewalls 112, 116. The retainer members assist in maintaining the cables 119 within the interior 118 of the trough member 100.

Figure 3:
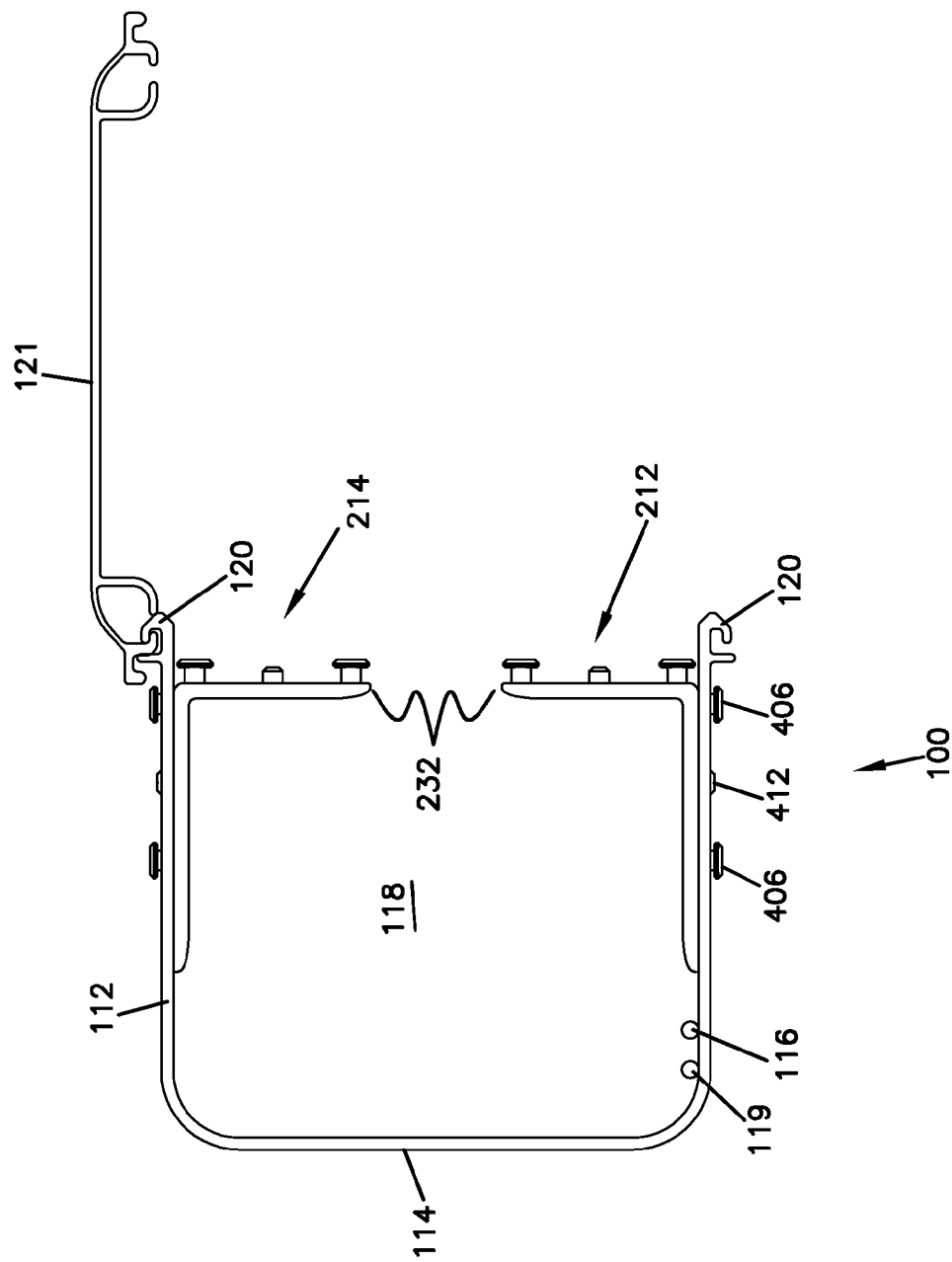
FIG. 3 is an end view of a portion of the cable routing system of FIG. 1.

For example, as shown in FIG. 3, a portion of the trough member 110 is shown. The retainer members 212, 214 are coupled to sidewalls 112, 116, respectively. The retainer members 212, 214 extend towards one another to cover a portion of the open end of the trough member 100. A space 232 formed between the retainer members 212, 214 allows the cables 119 to enter and exit the interior 118. The space 232 is smaller than the opening of the trough member 100 to assist in cable retention when the cover 121 is in the open position.

Figure 4:
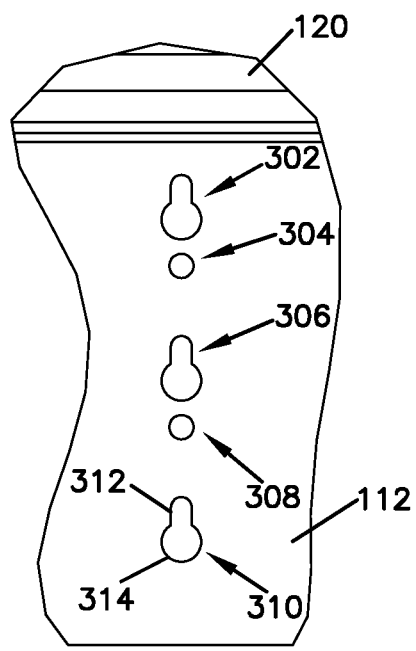
FIG. 4 is a side view of a sidewall of an example trough member of the portion of the cable routing system of FIG. 3.

Referring now to FIG. 4, a portion of the sidewall 112 of the trough member 100 is shown. The sidewall 112 includes a plurality of openings 302, 304, 306, 308, 310 formed in a line along the sidewall 112. The openings 302, 304, 306, 308, 310 are formed at periodic intervals along the sidewalls 112, 116. The openings 302, 306, 310 are "keyhole-shaped" to include a smaller diameter aperture 312 in communication with a larger diameter aperture 314. As described below, the openings 302, 304, 306, 308, 310 allow the retainer members to be coupled to the sidewalls 112, 116 in a variety of manners.

Figure 5:
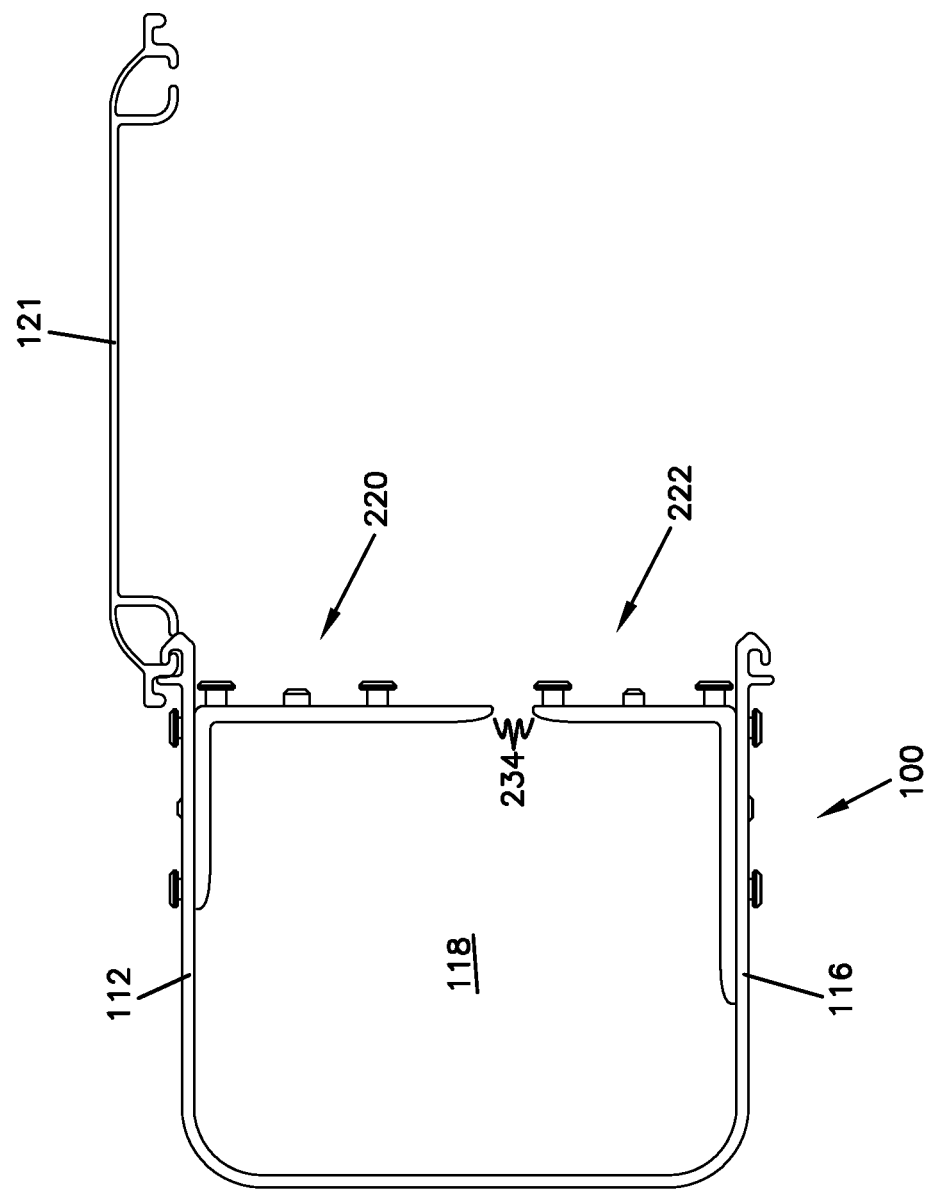
FIG. 5 is an end view of another portion of the cable routing system of FIG. 1.

For example, referring now to FIG. 5, another portion of the trough member 100 is shown. The retainer member 220 extends farther across the opening of the trough member 100 so that an opening 234 formed between the retainer members 220, 222 is smaller than the opening 232. Other configurations, as described below, are possible.

Figure 6:
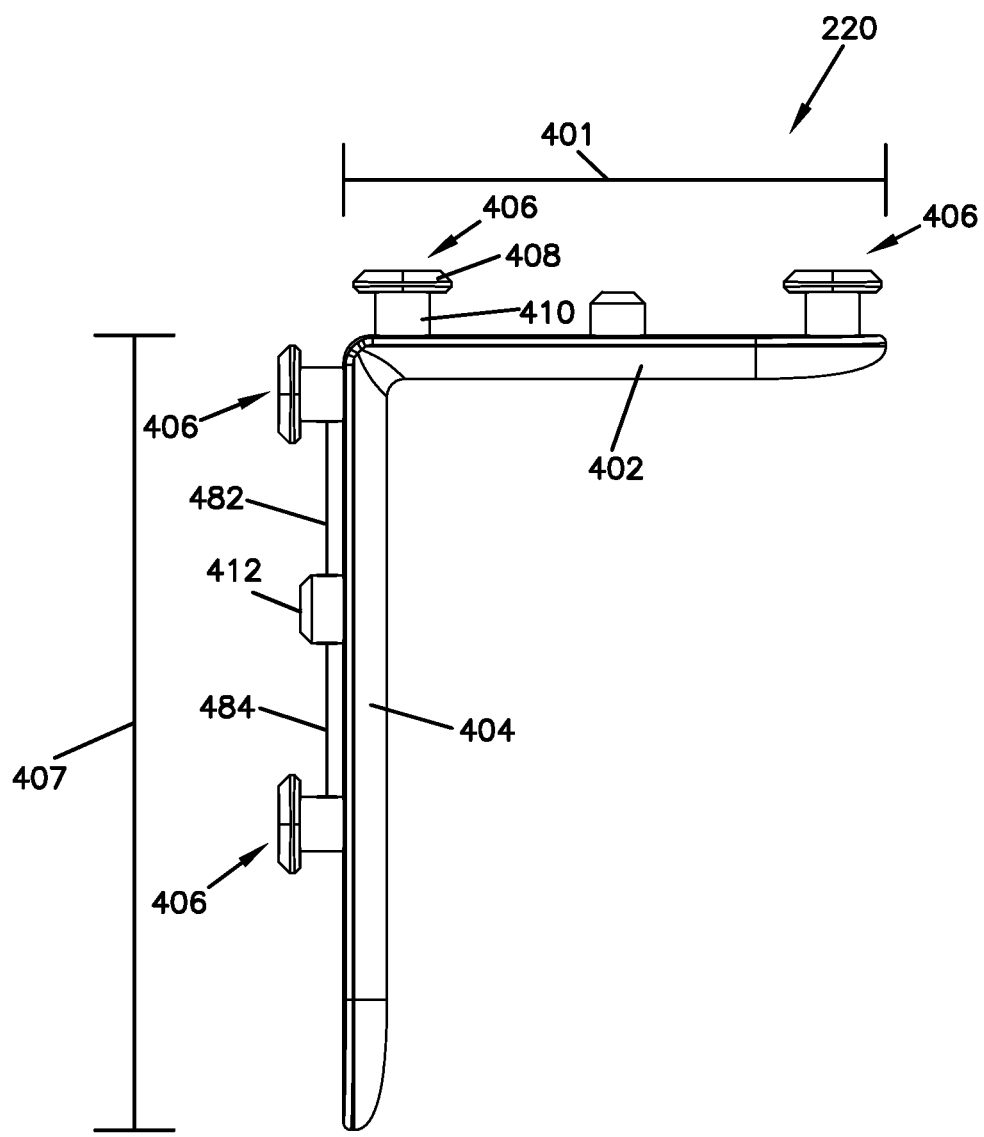
FIG. 6 is an end view of an example retainer member of the cable routing system of FIG. 1.
Figure 7:
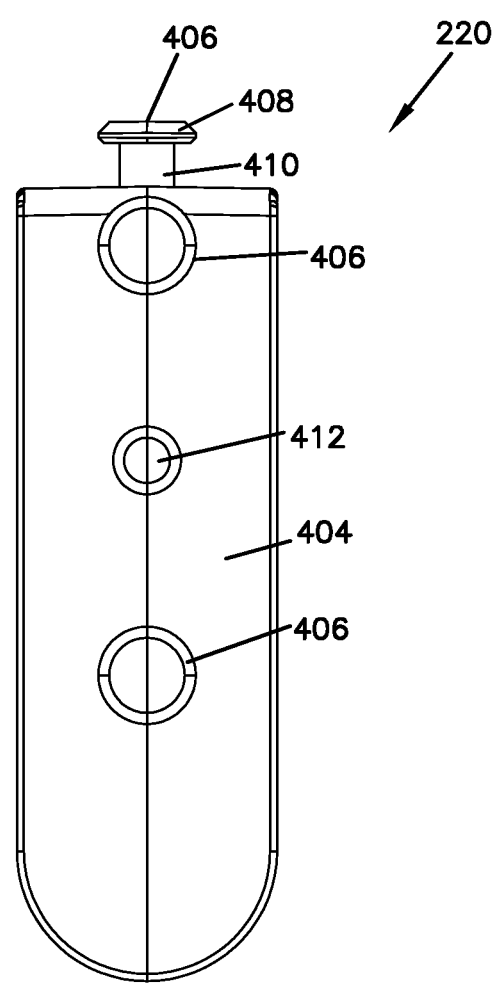
FIG. 7 is a side view of the retainer member of FIG. 6.
Figure 8:
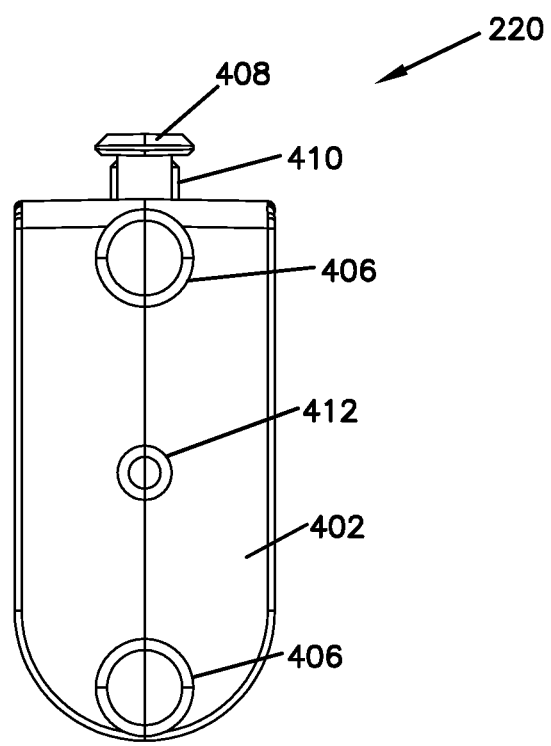
FIG. 8 is another side view of the retainer member of FIG. 6.

Referring now to FIGS. 6-8, one of the retainer members, retainer member 220, is shown. The retainer member 220 includes a first portion 402 and a second portion 404. The first portion 402 is coupled to the second portion 404 at an angle (e.g., a right angle or another obtuse angle) so that the retainer member 220 forms an "L" shape.

The first and second portions 402, 404 each include locking members 406 and detent members 412. Two locking members 406 are provided on each of the first and second portions 402, 404.

The locking members 406 each include a head portion 408 and a stem portion 410. The head portion 408 of each of the locking members 406 on either of the first and second portions 402, 404 is sized to fit into and through the larger diameter apertures 314 of two adjacent ones of the openings 302, 306, 310 in the sidewalls 112, 116 of the trough member. Once in position extending through two of the openings 302, 306, 310, the stem portions 410 can be slid into the smaller diameter apertures 312. When the stems portions 410 are positioned in the smaller diameter apertures 312 (referred to as the locked position), the head portions 408 are too large to fit through the smaller diameters apertures 312. In addition, when moved into this locked position, the detent member 412 is positioned in the respective opening 304, 308 on the sidewall 112, 116. In this locked position, the retainer member 220 is coupled to the respective sidewall 112, 116.

In the example shown, either the first portion 402 or the second portion 404 can be coupled to the respectively sidewall 112, 116, since both portions include the locking members 406 and detent members 412. This can be advantageous, for example, when the first and second portions 402, 404 are different lengths.

In the example shown, a length 401 of first portion 402 is shorter than a length 403 the second portion 404. If a shorter retainer is desired in a certain trough member, the second portion 404 can be coupled to the respective sidewall 112, 116, thereby allowing the shorter first portion 402 to extend into the interior 118 of the trough member 100. Conversely, if a longer retainer is desired, the first portion 402 can be coupled to the respective sidewall 112, 116, thereby allowing the longer second portion 404 to extend into the interior 118 of the trough member 100. Other configurations are possible.

Figure 9:
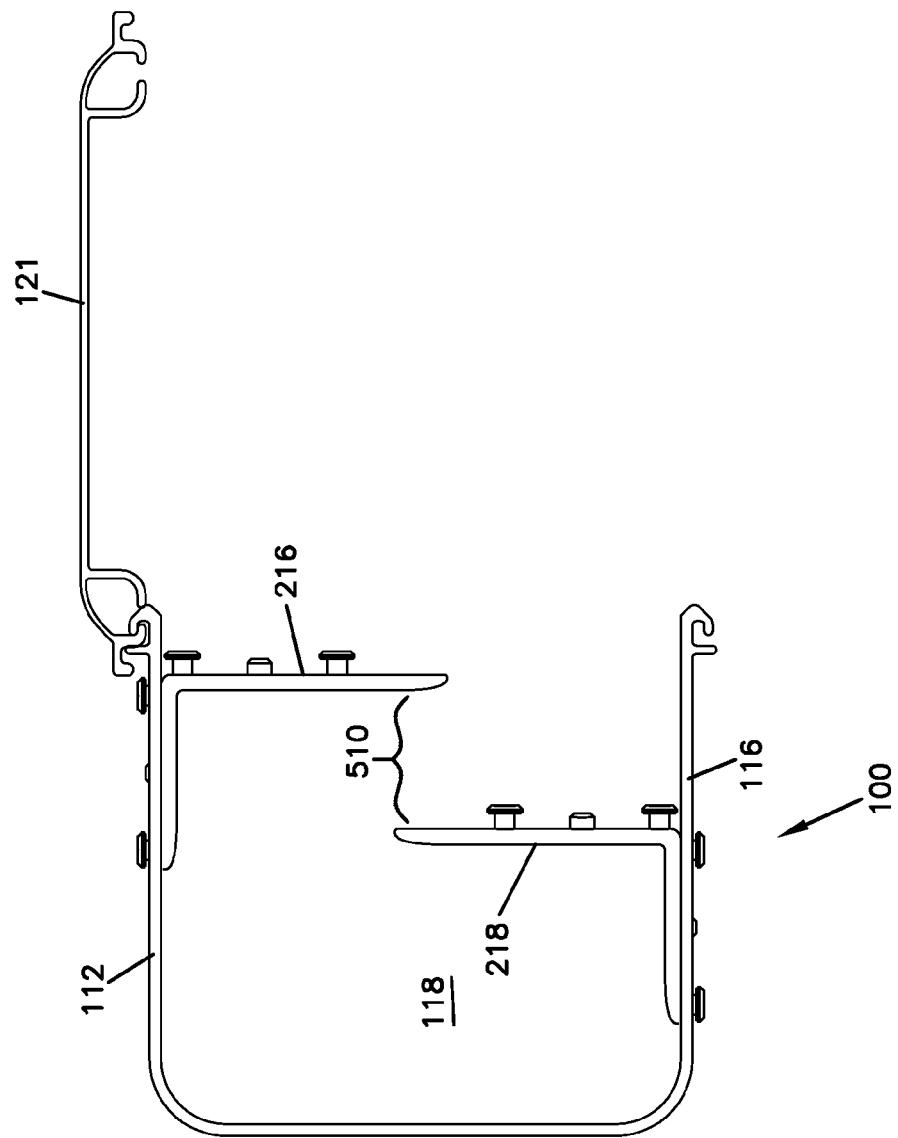
FIG. 9 is an end view of another portion of the cable routing system of FIG. 1.

For example, referring now to FIG. 9, another portion of the trough member 100 is shown. The retainer member 216 is mounted in the first two openings 302, 306 on the sidewall 112, while the retainer member 218 is mounted in the second two openings 306, 308 on the sidewall 116. This results in the entire opening of the trough member 100 being covered, and creates an opening 510 between the retainer members 216, 218. The cable that is positioned within the interior 118 of the trough member 100 must be moved through this opening 510 in a zigzag or tortuous path to remove the cable, thereby further maintaining the cable in the trough member 100.

Figure 10:
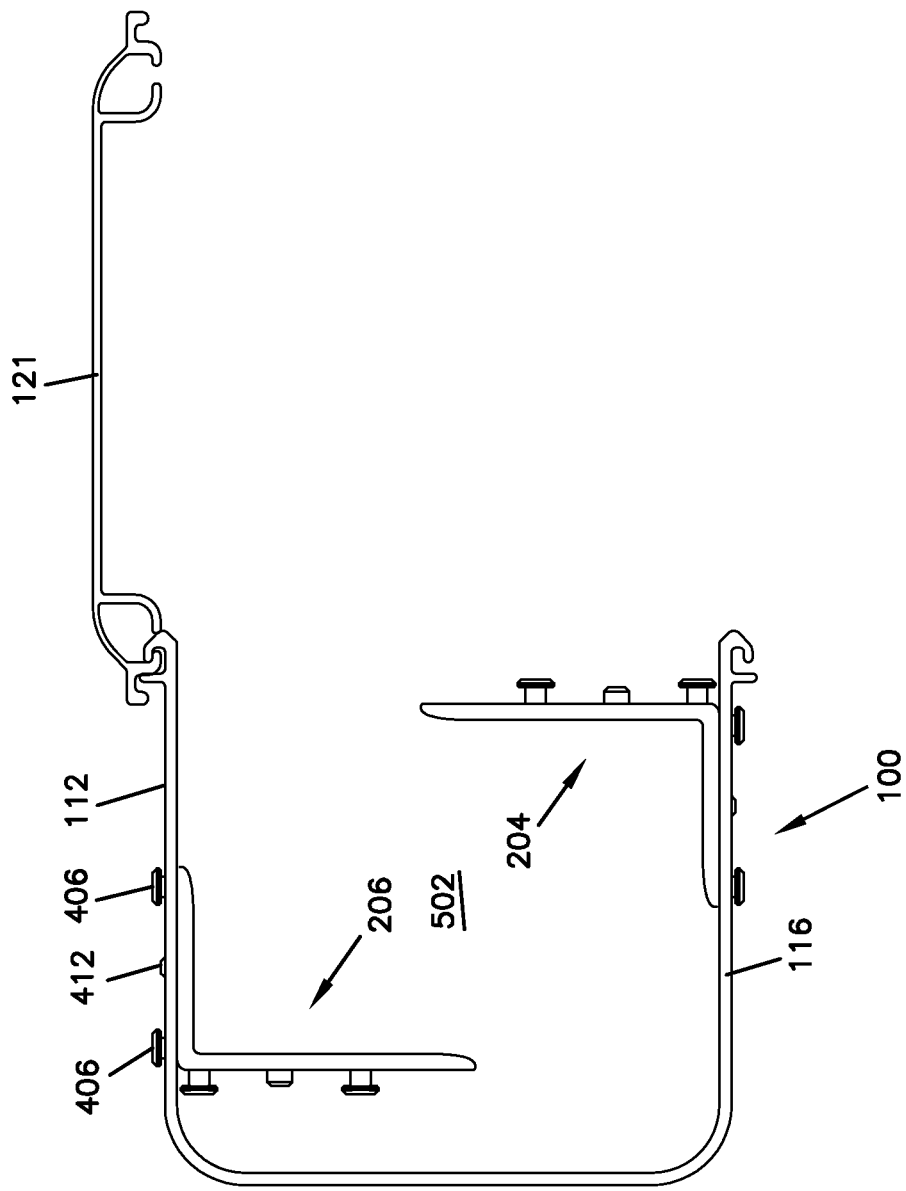
FIG. 10 is another end view of another portion of the cable routing system of FIG. 1.

In another example, referring now to FIG. 10, retainer members 204, 206 are shown. The retainer member 206 is inverted when the retainer member 206 is mounted to the sidewall 116. In this configuration, the locking members 406 of the retainer member 206 can be placed in the openings 302, 306, 310 formed on sidewall 116 to mount the retainer member 206. The resulting configuration is a central channel 502 formed between the retainer members 204, 206. Cables can be routed through this central channel 502, if desired.

The retainer members can be inverted when mounted to the sidewalls 112, 116 because the distances 482, 484 between the locking members 406 and the detent member 412 are equal on each portion of the retainer members. See FIG. 6. In an alternative embodiment, the distances 482, 484 can be configured to be different (and the placement of the mating openings 302, 304, 306, 308, 310 on the sidewalls 112, 116 correspondingly modified as well) so that the retainer members can only be coupled to the sidewalls 112, 116 in one orientation.

One example use of the retainer members is as follows. Initially, one or more of the retainer members are selected based on the need for cable retainment. For example, if greater retainment is needed, retainer members having a longer first or second portion can be selected so that the resulting exposed opening in the trough member is smaller.

Once selected, the retainer members are mounted to the sidewalls of the trough member at the desired position, height, and orientation. This is accomplished by placing the locking members of each of the retainer members in the two openings at the desired position, height, and orientation. The retainer member is then moved so that the locking members are slid into the narrower portion of the openings and the detent member is received in the mid-point opening on the sidewall. In this position, the retainer member is mounted to the sidewall. Multiple retainer members can be mounted at different positions along the trough member, at different heights, and at different orientations to accomplish the desired retainment.

To remove the retainer members, each retainer member is grasped and pulled slightly away from the sidewall. This moves the detent member out of the opening in the sidewall. At this point, the retainer member can be slid relative to the sidewall so that the locking members move to the wider portions of the openings in the sidewalls. The locking members can then pass through the wider portions of the openings, and the retainer member can then be removed from the sidewall.

Figure 11:
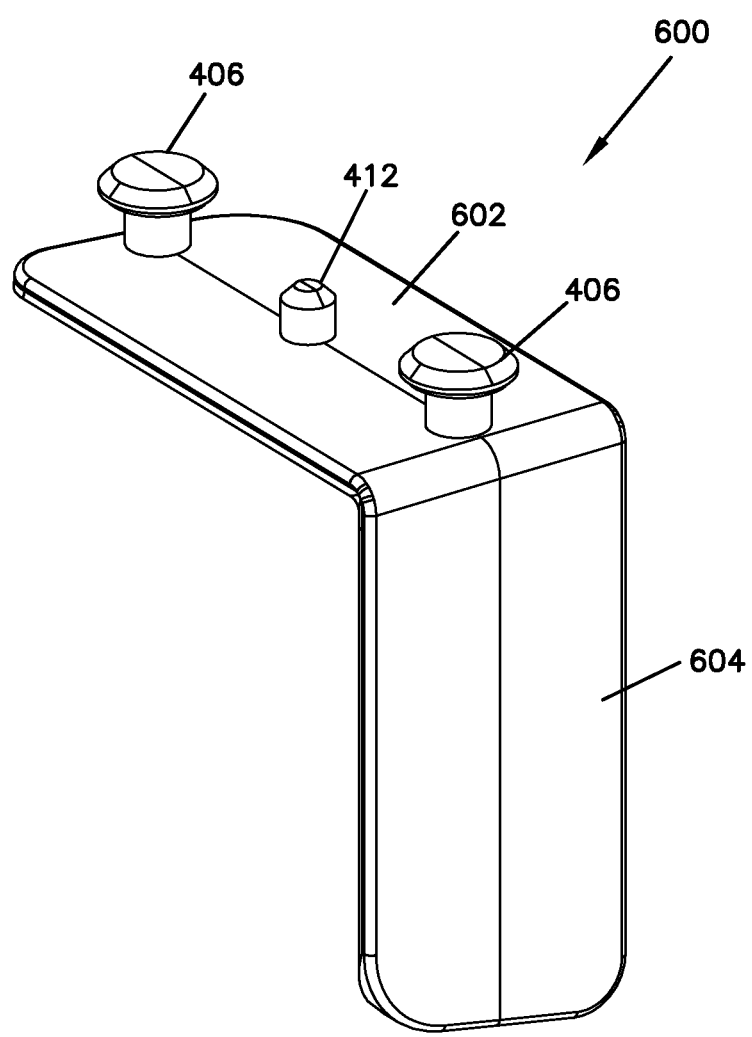
FIG. 11 is a perspective view of another example retainer member.
Figure 12:
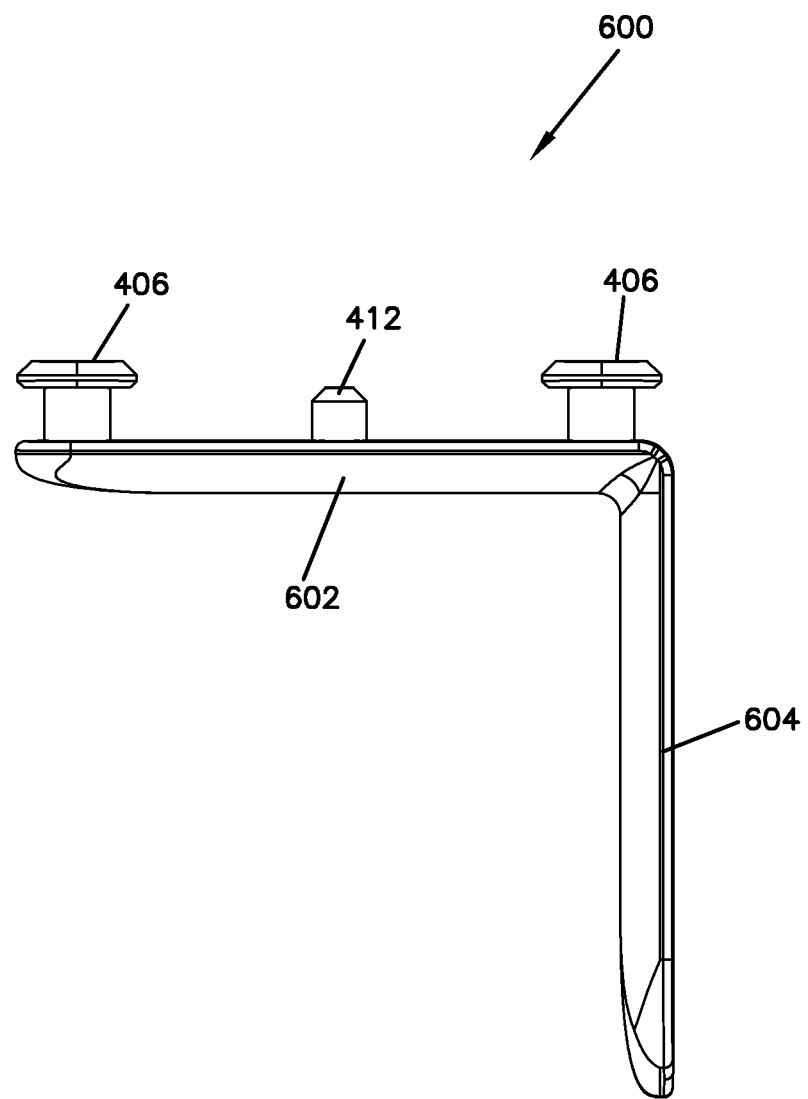
FIG. 12 is an end view of the retainer member of FIG. 11.
Figure 13:
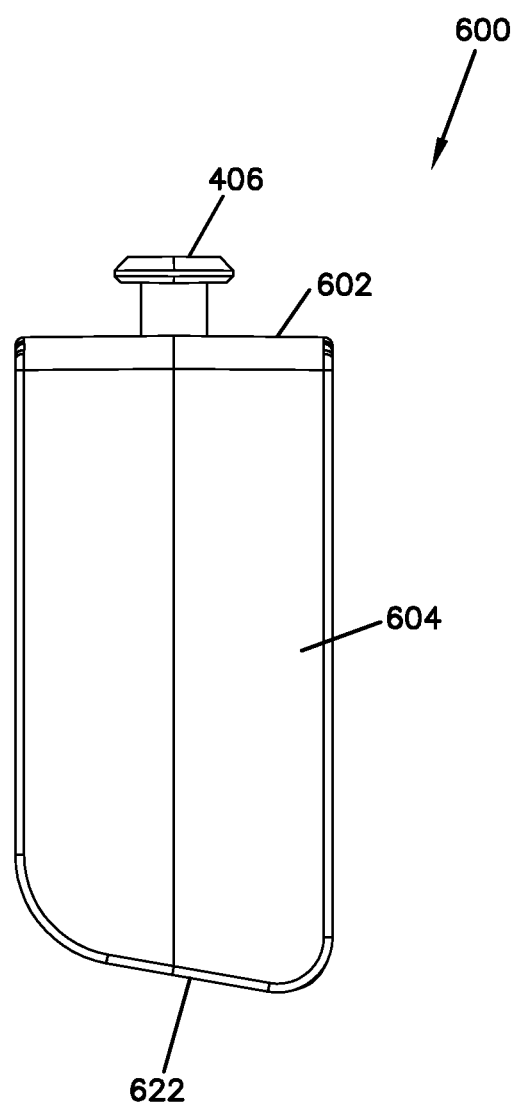
FIG. 13 is a side view of the retainer member of FIG. 11.

Referring now to FIGS. 11-13, another embodiment of a retainer member 600 is shown. The retainer member 600 is similar to that of the retainer members described above, except that the retainer member 600 only includes locking members 406 and the detent member 412 on a first portion 602 of the retainer member 600. The second portion 604 does not include any locking members or detents. In this configuration, only the first portion 602 of the retainer member 600 can be mounted to the sidewalls 112, 116 of the trough member 100.

In the example shown, the second portion 604 of the retainer member 600 also includes an angled end portion 622. The angled end portion 622 can be mated with a corresponding retainer member mounted to the opposite sidewall of the trough member to form an opening that is angled with respect to the longitudinal direction of the trough member.

Figure 14:
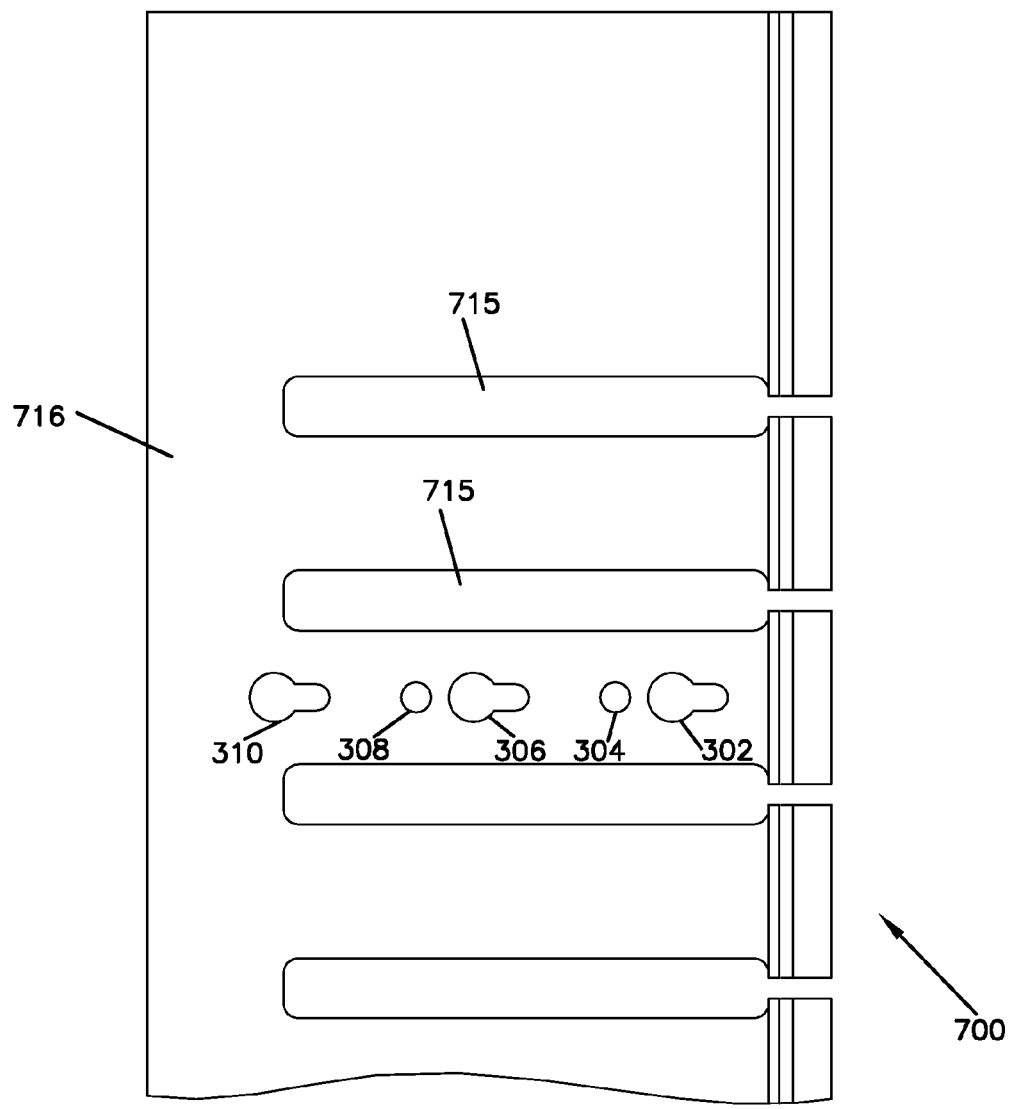
FIG. 14 is a side view of a portion of another example trough member.
Figure 15:
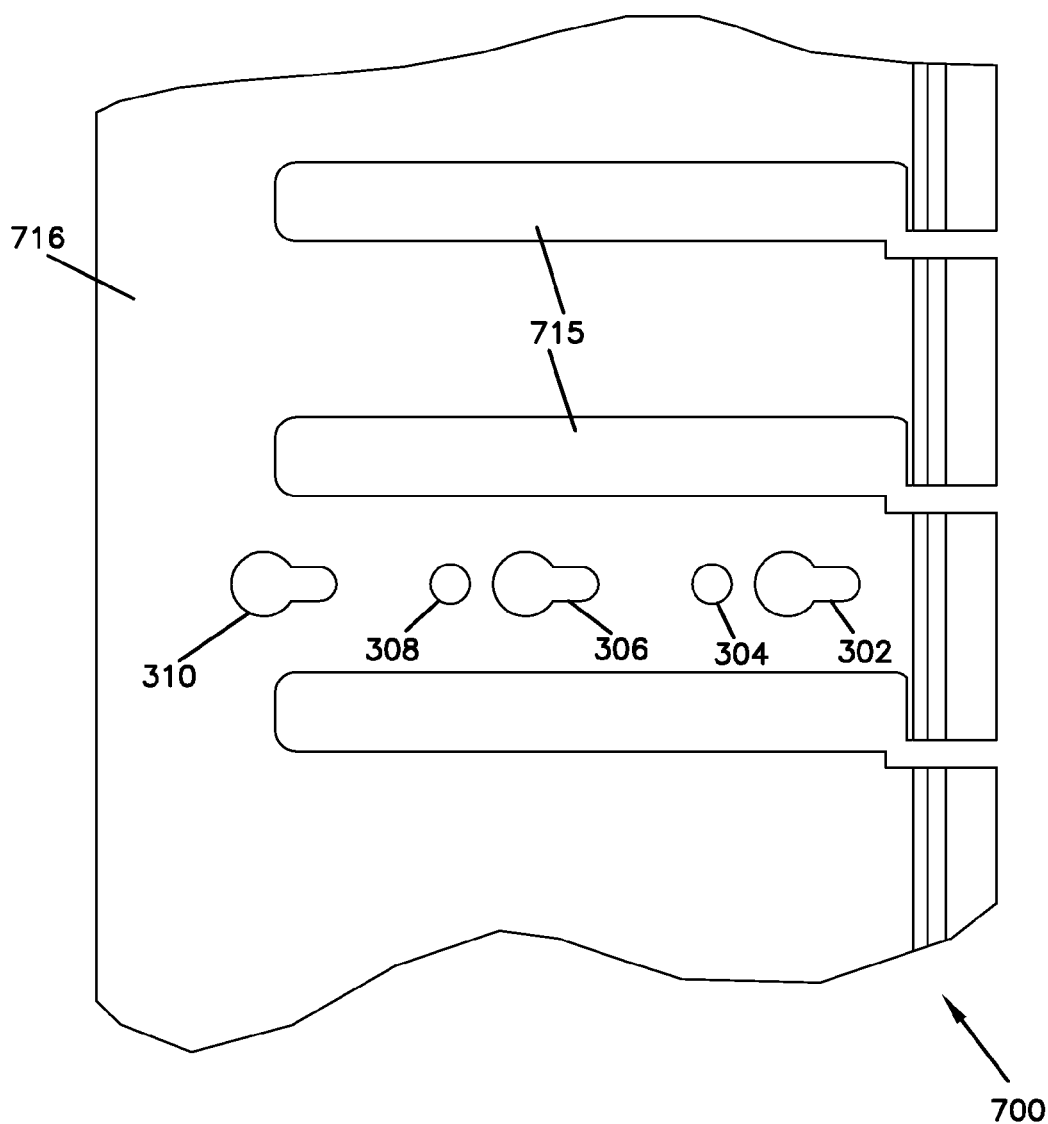
FIG. 15 is a side view of another portion of the trough member of FIG. 14.
Figure 16:
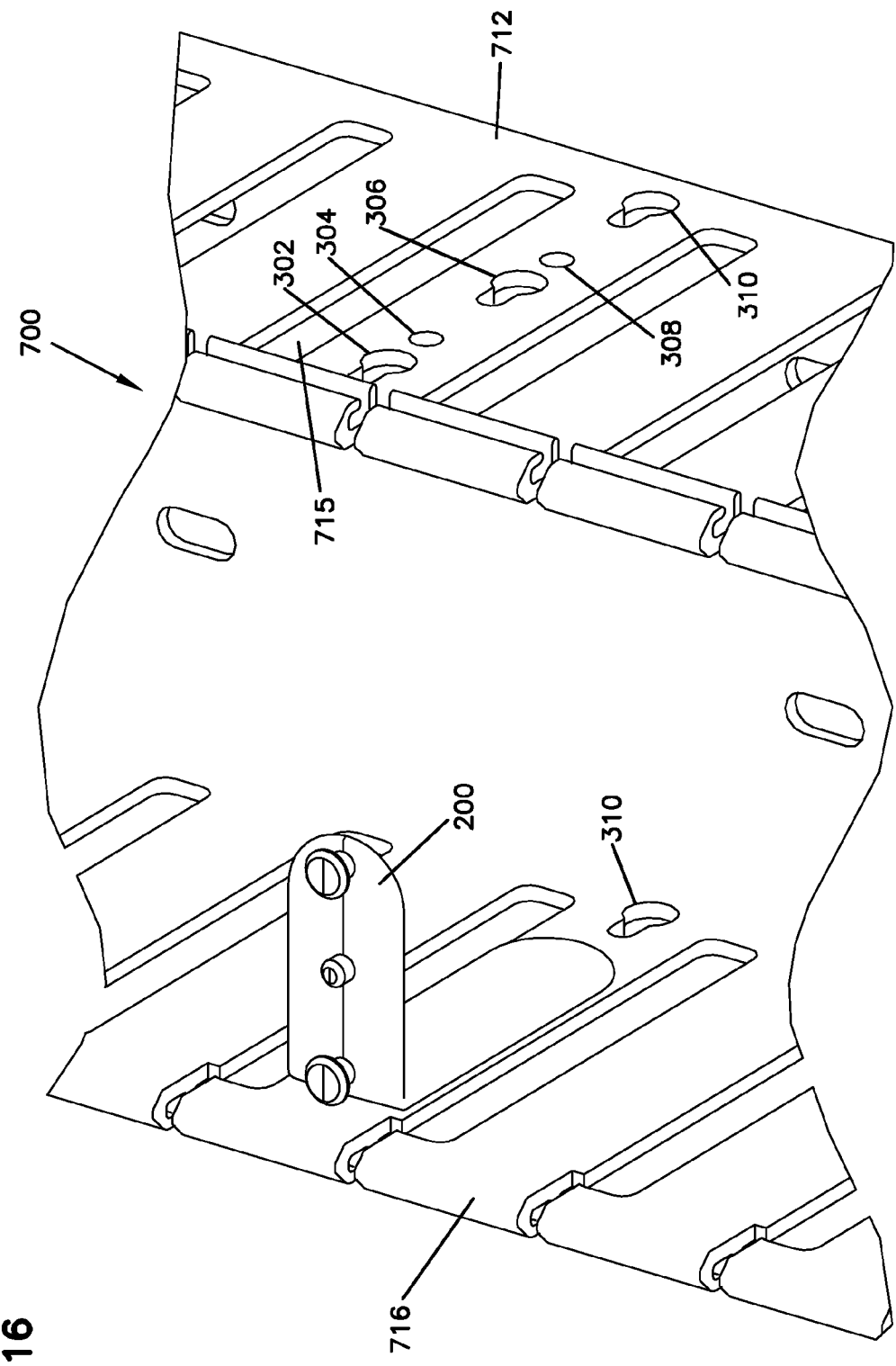
FIG. 16 is a perspective view of a portion of the trough member of FIG. 15.
Figure 17:
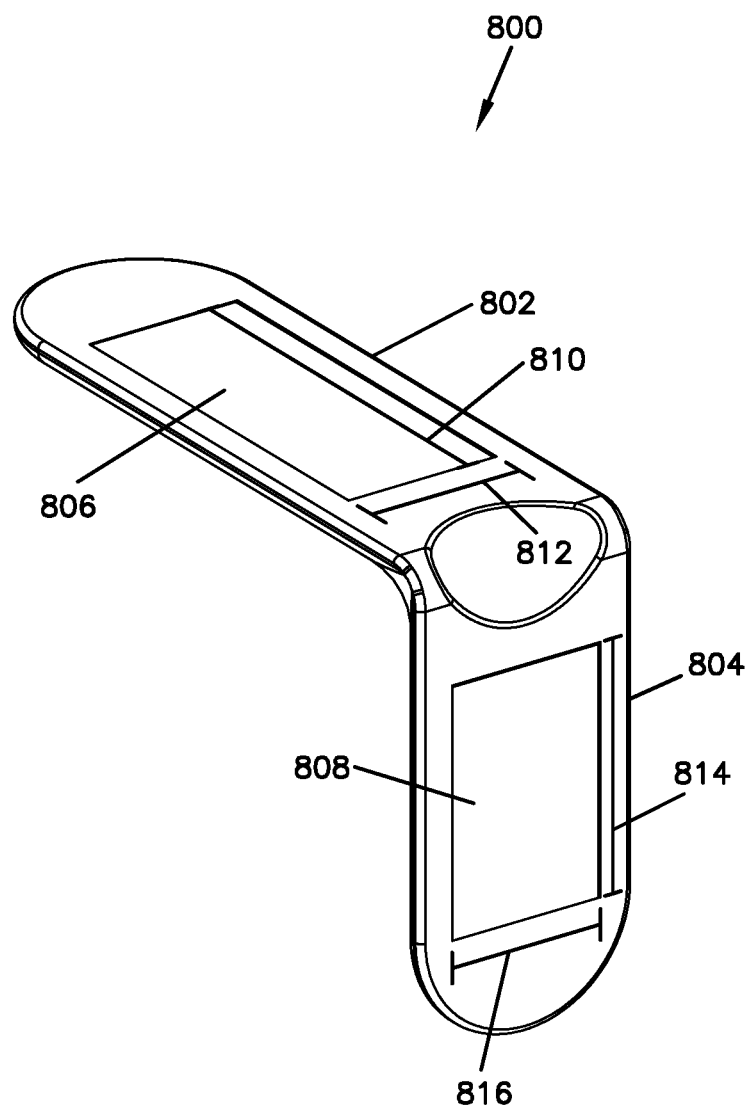
FIG. 17 is a perspective view of another example retainer member.
Figure 18:
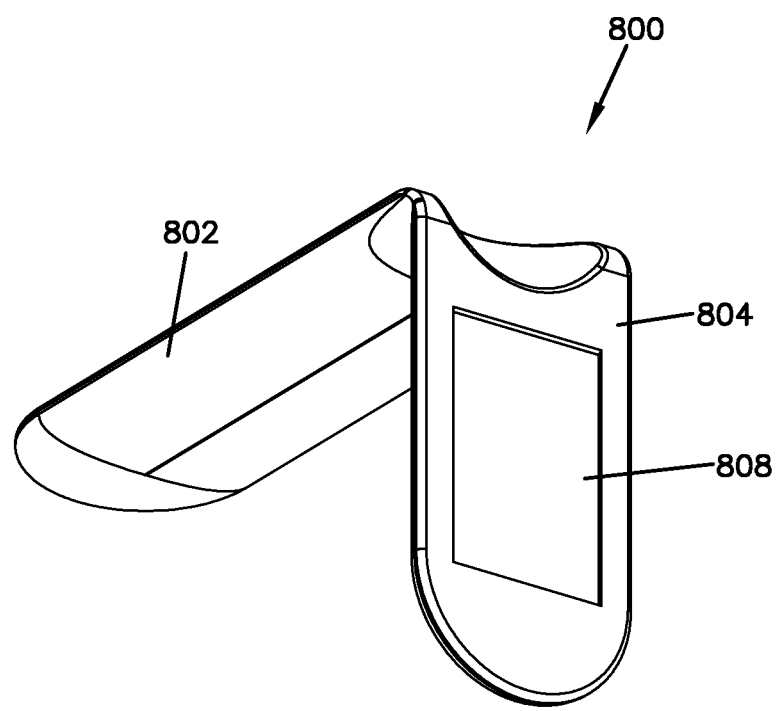
FIG. 18 is another perspective view of the retainer member of FIG. 17.
Figure 19:
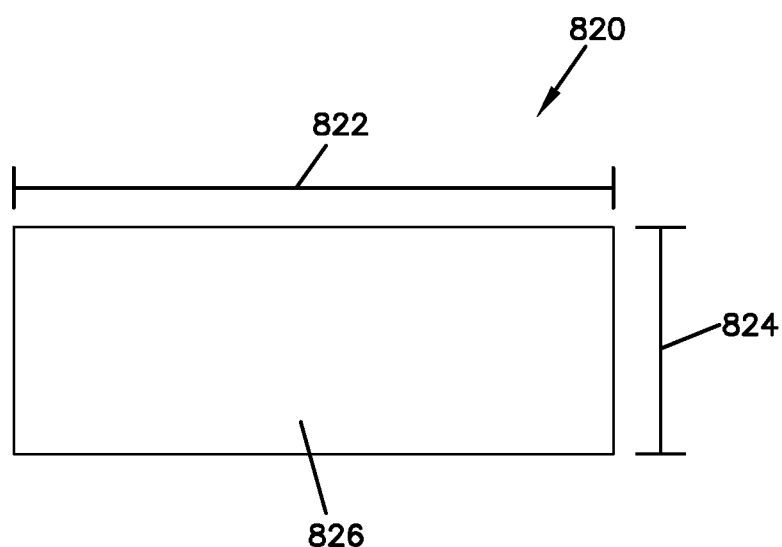
FIG. 19 is a top view of an example mounting member.
Figure 20:
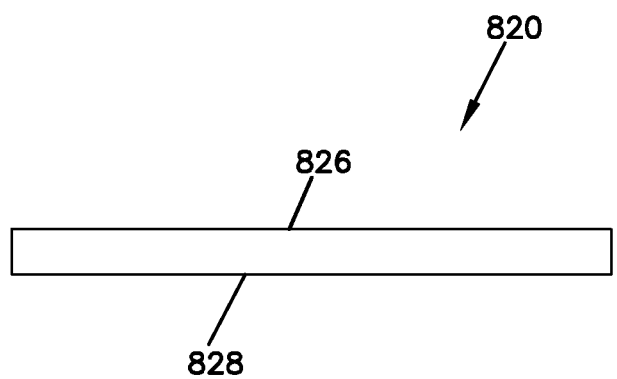
FIG. 20 is a side view of the mounting member of FIG. 19.

Referring now to FIGS. 14-16, another example trough member 700 is shown. The trough member 700 is similar to the trough member 100, except that sidewalls of the trough member 700 are slotted instead of being solid like the trough member 100.

The trough member 700 includes a plurality of slots 715 formed in the sidewalls 712, 716. The slots 715 are sized to allow cable to enter or exit the interior space of the trough member 700 through the slots 715. In the examples shown, the slots 715 are formed at periodic intervals along the sidewalls 712, 716. Other configurations are possible.

The trough member 700 also includes the openings 302, 304, 306, 308, 310 formed in a line along the sidewalls 712, 716. The openings 302, 304, 306, 308, 310 are formed at periodic intervals along the sidewalls 712, 716 between adjacent slots 715. The openings 302, 304, 306, 308, 310 allow the retainer members to be coupled to the sidewalls 712, 716, as shown in FIG. 16.

Referring now to FIGS. 17-20, another embodiment of a retainer member 800 is shown. The retainer member 800 is similar to that of the retainer members described above, except that the retainer member 800 does not have any locking members 406 and detent members 412 on first and second portions 802, 804 of the retainer member 800. Instead, the retainer member 800 includes mounting surfaces 806, 808 that are sized to receive a mounting member 820. In example embodiments, the mounting member 820 is a double-sided piece of adhesive tape that can be used to mount the retainer member 800 to the sidewalls of the trough members 100, 700.

For example, the mounting surfaces 806, 808 include dimensions 810, 812 and 814, 812, respectively. The dimensions 806, 808, 810, 812 can be sized to receive the mounting member 820, which includes dimensions 822, 824. The mounting member 820 includes first and second sides 826, 828. Each of the sides 826, 828 includes a mounting substance, such as an adhesive like glue. One of the sides 826, 828 can be coupled to one of the mounting surfaces 806, 808, and the other of the sides 826, 828 can be mounted to one of the sidewalls of the trough members 100, 700.

In one example, the mounting member 820 is affixed to one of the mounting surfaces 806, 808 when assembled, and the user can remove a release liner and mount the retainer member 800 to one of the sidewalls of the trough members 100, 700 when in use. In another example, the mounting member 820 can be provided separate from the retainer member 800. The user can decide which of the first and second portions 802, 804 to mount the mounting member 820.

In another example, the dimensions 810, 812 of the mounting surface 806 on the first portion 802 can differ from the dimensions 814, 816 of the mounting surface 808 of the second portion 808. The dimensions 822, 824 of the mounting member 820 can be sized to correspond to one of the dimensions 810, 812 of the mounting surface 806 or the dimensions 814, 816 of the mounting surface 808.

In yet another example, the mounting surface 804, 806 need not be defined on the first and second portions 802, 804. Instead, the mounting member 820 can be placed anywhere on the surface of the mounting surfaces 804, 806.

Other configurations are possible. For example, instead of using the mounting member 820, glue can be applied directly to the first or second portions 802, 804 to mount the respective portion 802, 804 to one of the sidewalls of the trough members 100, 700.

In example embodiments, the trough members are extruded from a synthetic thermoplastic polymer such as an acrylonitrile-butadiene-styrene(ABS)/polycarbonate blend. Other manufacturing methods (e.g., molding) and materials can also be used.

The openings in the sidewalls of the trough members for receiving the locking members and detent members can be formed by punching the sidewalls of the trough members at the desired periodic intervals. The slots in the trough member 700 can be formed by punching and/or cutting the slots into the sidewalls of the trough member.

The retainer members can be made of from a synthetic thermoplastic polymer such as an acrylonitrile-butadiene-styrene(ABS)/polycarbonate blend. The retainer members can be formed using various manufacturing techniques, such as by injection molding. Other manufacturing techniques and materials can be used.

The various embodiments described above are provided by way of illustration only and should not be construed to limiting. Various modifications and changes that may be made to the embodiments described above without departing from the true spirit and scope of the disclosure.

What is claimed is:

1. A cable routing system, comprising:
a trough member including a base portion, first and second sidewall portions extending from the base portion to form a trough shape with an open end, and a plurality of openings formed along the first and second sidewall portions; and
a retainer member including a first portion and a second portion, the first portion being coupled to the second portion at an angle, the first portion including at least two locking members coupled to the first portion;
wherein the locking members are received in two of the openings in one of the first and second sidewalls to couple the retainer member to one of the first and second sidewalls;
wherein, the second portion of the retainer member extends into the open end of the trough member to retain fibers in the trough member; and
wherein a free end of the second portion is angled, the angle of the free end being configured to be oriented with a corresponding retainer member mounted to an opposite sidewall to form an opening that is angled with respect to a longitudinal direction of the trough member.

2. The cable routing system of claim 1, wherein the first and second sidewall portions are solid.

3. The cable routing system of claim 1, wherein the first and second sidewall portions are slotted.

4. The cable routing system of claim 1, wherein one or more of the openings are keyhole-shaped.

5. The cable routing system of claim 4, wherein the keyhole-shaped openings each include a smaller diameter aperture in communication with a larger diameter aperture.

6. The cable routing system of claim 5, wherein each of the locking members includes a head portion and a stem portion, the head portion being sized to fit through the larger diameter aperture, and the stem portion being sized to be received in the smaller diameter aperture.

7. The cable routing system of claim 1, wherein two additional locking members are coupled to the second portion of the retaining member.

8. The cable routing system of claim 1, further comprising a detent member coupled to the first portion, the detent member being sized to be received in a third opening in one of the first and second sidewalls.

9. The cable routing system of claim 1, wherein a corresponding retainer member coupled to an opposite sidewall is mounted at a level different than that of the retainer member.

10. The cable routing system of claim 9, wherein an opening between the retainer member and the corresponding retainer member forms a zigzag or tortuous path when cable within the trough member is removed.

11. The cable routing system of claim 1, wherein the first and second sidewall portions each includes at least two sets of openings located longitudinally at periodic intervals along the first and second sidewall portions.

12. A retainer member for a cable trough member, the retainer member comprising:
   a first portion;
   a second portion, the second portion being coupled to the first portion at an angle;
   first and second locking members coupled to the first portion, each of the first and second locking members including a head portion and a stem portion, the head portion being sized to fit through a larger diameter aperture in a sidewall of the cable trough member, and the stem portion being sized to be received in a smaller diameter aperture in the sidewall; and
   first and second locking members coupled to the second portion of the retaining member;
   wherein a first longitudinal length of the first portion is longer than a second longitudinal length of the second portion;
   wherein, when the first and second locking members of the first portion are coupled to a wall of a cable trough, the second portion extends into an interior of the trough member a second distance corresponding to the second longitudinal length;
   wherein, when the first and second locking members of the second portion are coupled to the wall of the cable trough, the first portion extends into the interior of the trough member a first distance corresponding to the first longitudinal length; and
   wherein the first distance is greater than the second distance.

13. The retainer member of claim 12, further comprising a detent member coupled to the first portion, the detent member being sized to be received in a third opening in the sidewall.

14. The retainer member of claim 12, wherein a free end of the first portion is angled to mate with a corresponding retainer member mounted to an opposite sidewall of the cable trough member to form an opening that is angled with respect to a longitudinal direction of the trough member.

15. A retainer member for a cable trough member, the retainer member comprising:
   a first portion;
   a second portion, the second portion being coupled to the first portion at an angle;
   a first attachment means on the first portion for coupling the retainer member to a sidewall of the cable trough member; and
   a second attachment means on the second portion for coupling the retainer member to the sidewall of the cable trough member;
   wherein, when the first attachment means is coupled to the sidewall of the cable trough member, the second portion extends into an interior of the cable trough member; and
   wherein, when the second attachment means is coupled to the sidewall of the cable trough member, the first portion extends into an interior of the cable trough member.

16. The retainer member of claim 15, wherein the attachment means includes one or more locking members.

17. The retainer member of claim 15, wherein the attachment means includes adhesive.

* * * * *